US010924346B1

(12) United States Patent
Banerjee et al.

(10) Patent No.: US 10,924,346 B1
(45) Date of Patent: Feb. 16, 2021

(54) SYSTEM AND METHOD FOR MIGRATING NETWORK POLICIES OF SOFTWARE-DEFINED NETWORK COMPONENTS

(71) Applicant: VMWARE, INC., Palo Alto, CA (US)

(72) Inventors: Sujeet Banerjee, Bangalore (IN); Umar Shaikh, Bangalore (IN); Amarjeet Singh, Bangalore (IN); Sureshbabu Koyadan Chathoth, Bangalore (IN); Sachin Thakkar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/591,647

(22) Filed: Oct. 3, 2019

(30) Foreign Application Priority Data

Jul. 24, 2019 (IN) .............................. 201941029990

(51) Int. Cl.
*H04L 12/24* (2006.01)

(52) U.S. Cl.
CPC ...... *H04L 41/0846* (2013.01); *H04L 41/0803* (2013.01); *H04L 41/0893* (2013.01)

(58) Field of Classification Search
CPC ............. H04L 41/0846; H04L 41/0803; H04L 41/0893
See application file for complete search history.

(56) References Cited

U.S. PATENT DOCUMENTS

2017/0123777 A1* 5/2017 Mittal ........................ G06F 8/71
2018/0034703 A1* 2/2018 Anholt ................ H04L 41/0893

OTHER PUBLICATIONS

Wikipedia, "Software-defined networking", https://en.wikipedia.org/wiki/Software-defined_networking, retrieved Jun. 1, 2020, 7 pgs.
Cisco, "CIS—CISCO Switch backup and restore", https://www.cisco.com/c/en/us/support/docs/ios-nx-ossoftware/os-software-releases-122-mainline/46741-backup-config.html, retrieved Jul. 1, 2020, updated Aug. 3, 2006, 7 pgs.
Cisco, "Using Templates to Configure Devices", Chapter 21, https://www.cisco.com/c/en/us/td/docs/net_mgmt/prime/infrastructure/3-1/user/guide/pi_ug/config-temp.pdf, retrieved Jul. 1, 2020, 78 pgs.

(Continued)

*Primary Examiner* — Adnan M Mirza
(74) *Attorney, Agent, or Firm* — Loza & Loza, LLP

(57) ABSTRACT

A system and method for migrating configurations of a software-defined network (SDN) component from a source computing environment to a destination computing environment uses a configuration export file that includes a metadata section and a templates section. The metadata section includes correlation keys for dependencies found in fetched configurations of the SDN component that correspond to dependency keywords in a configurable dictionary. The templates section includes reframed configurations of the dependencies with at least one reference to the correlation keys in the metadata section. At least some correlation-key references within reframed configurations in the templates section of the configuration export file are substituted with correlation-key replacements for the destination computing environment, which are then applied to a target SDN component in the destination computing environment.

20 Claims, 13 Drawing Sheets

(56) References Cited

OTHER PUBLICATIONS

Vmware, "Network and Security Objects", https://docs.vmware.com/en/VMware-NSX-Data-Center-for-vSphere/6.4/com.vmware.nsx.admin.doc/GUID-C0760D51-16F1-43B8-90D8-D39B47249157.html, retrieved Jul. 1, 2020, 2 pgs.

Vmware, "Working with Security Groups", https://docs.vmware.com/en/VMware-NSX-Data-Center-for-vSphere/6.4/com.vmware.nsx.admin.doc/GUID-16B3134E-DDF1-445A-8646-BB0E98C3C9B5.html, retrieved Jul. 1, 2020, 2 pgs.

Vmware, "NSX-V 6.3: Cross-VC NSX Security Enhancements", https://blogs.vmware.com/networkvirtualization/2017/02/nsx-6-3-cross-vc-nsx-securityenhancements.html/, retrieved Jul. 1, 2020, 12 pgs.

Vmware, "NSX API Guide", https://docs.vmware.com/en/VMware-NSX-Data-Center-for-vSphere/6.4/nsx_64_api.pdf, retrieved Jul. 1, 2020, 595 pgs.

Wikipedia, "Tree", https://en.wikipedia.org/wiki/Tree_(graph_theory), retrieved Jul. 1, 2020, 14 pgs.

Vmware, "Create an IP Address Group", https://docs.vmware.com/en/VMware-NSX-Data-Center-for-vSphere/6.4/com.vmware.nsx.admin.doc/GUID-D90798B6-C3AF-417D-B23C-6BE5381201AA.html, retrievced Jul. 1, 2020, 2 pgs.

W3C, "XML Path Language (XPath)", Version 1.0, updated Oct. 2016, https://www.w3.org/TR/1999/REC-xpath-19991116/, 35 pgs.

Vmware, "Understanding VM snapshots in ESXI (1015180)", https://kb.vmware.com/s/article/1015180, retrieve Jul. 1, 2020, 5 pgs.

Juniper Networks, "Advanced Policy-Based Routing Configuration Settings", https://www.juniper.net/documentation/en_US/cso2.1/topics/reference/general/cp-apbrconfiguration-settings.html, retrieved Jul. 1, 2020, 1 pg.

Wikipedia, "Pushdown automaton", https://en.wikipedia.org/wiki/Pushdown_automaton, retrieved Jul. 1, 2020, 8 pgs.

Goessner, "JSONPath—XPath for JSON", http://goessner.net/articles/JsonPath/, retrieved Jul. 1, 2020, 6 pgs.

Wikipeda, "Lambda calculus", https://en.wikipedia.org/wiki/Lambda_calculus, retrieved Jul. 1 2020, 17 pgs.

Oracle, "Java Tutorials—Lamda Expressions", https://docs.oracle.com/javase/tutorial/java/javaOO/lambdaexpressions.html, retrieved Jul. 1, 2020, 10 pgs.

Journaldev, "Python XML to JSON, XML to Dict", https://www.journaldev.com/19392/python-xml-to-json-dict, retrieved Jul. 1, 2020, 7 pgs.

Wikipedia, "Subnetwork", https://en.wikipedia.org/wiki/Subnetwork, retrieved Jul. 1, 2020, 8 pgs.

Vmware, "xpath-for-json", https://github.com/vmware/xpath-for-json, retrieved Jul. 1, 2020, 2 pgs.

Vmware, "Universal Network and Security Objects", https://docs.vmware.com/en/VMware-NSX-for-vSphere/6.2/com.vmware.nsx.admin.doc/GUIDD52361ED-4814-4472-8B29-F22EBDB4A478.html, retrieved Jul. 1, 2020, 1 pg.

Soundarajan, Vijayaraghavan et al. "Simplifying Virtualization Management with Graph Databases", VMware's Technical Journal, 2013, 8 pgs.

Cisco, "Cisco ASA 5500-X with FirePOWER", https://www.cisco.com/c/en_in/products/security/asa-firepower-services/index.html. retrieved Jul. 1, 2020, 14 pgs.

Vmware, "VMware Infrastructure (VI) API Reference Documentation", https://www.vmware.com/support/developer/vc-sdk/visdk25pubs/ReferenceGuide/, retrieved Jul. 1, 2020, 1 pg.

Vmware, "VMware HCX", https://www.vmware.com/content/dam/digitalmarketing/vmware/en/pdf/products/nsx/vmware-nsx-hybrid-connect-faq.pdf, retrieved Jul. 1, 2020, 2 pgs.

Wikipedia, "Dependency graph", https://en.wikipedia.org/wiki/Dependency_graph#Recognizing_impossible_evaluations, retrieved Jul. 1, 2020, 3 pgs.

Wikipedia, "Directed acyclic graph", https://en.wikipedia.org/wiki/Directed_acyclic_graph, retrieved Jul. 1, 2020, 16 pgs.

Stackoverflow, Diff for Directed Acyclic Graphs:, https://stackoverflow.com/questions/16553343/diff-for-directed-acyclic-graphs, retrieved Jul. 1, 2020, 4 pgs.

* cited by examiner

```
init: [ firewall, /.   edge, /.    vm, /. ]
firewall
:

- ipset, //*[value.match('ipseL-[0-9]+')]

- ip, //*[ value.match( '[0-9]{1,3}\.[0-9]{1,3}\.[0-9]{1,3}\.[0-9]{1,3}')]

- interface, //*[value.match('vnic-[0-9]+')]

- vm, //*[value.match('vm-[0-9]+')]

- secgrp, //*[value.match('securitygroup-[0-9]+')]
ipset:

- ip, //*[ value.match('[0-9]{1,3}\.[0-9]{1,3}\.[0-9]{1,3}\.[0-9]{1,3}')]
ip:
 - interface, /.
  action --> { index <= findIndex($(interface).subnet, $(iP).value);
              return lambda{indexOf (interface subnet, index)} }
 - interface: [ ]
edge: [interface edgefirewall nat dhcp  ... (omitted) ]

Vm: ... (omitted for brevity)

Secgrp:

- ipset, //members/*[value.match('ipseL-[0-9]+')]

- interface, //members/*[value.match('vnic-[0-9]+')]

- vm, //members/*[value.match('vm-[0-9]+')]

- secgrp, //members/*[value.match('security group-[0-9]+')]
    ...
```

FIG. 7

```xml
<firewallRule>
    <id>131076</id>                                          ⟵ 900
    <ruleTag>1</ruleTag>
    <name>TEZZT</name>
    <ruleType>user</ruleType>
    <enabled>true</enabled>
    <loggingEnabled>false</loggingEnabled>
    <description>TEZZT</description>
    <matchTranslated>false</matchTranslated>
    <action>accept.</action>
    <sourece>
            <exclude>false</exclude>
902 ⟶    <ipAddress>192.0.33.0/24</ipAddress>
904 ⟶    <groupingObjectId>dvportgroup-64</groupingObjectId>
    </source>
    <destination>
            <exclulde>false</exclude>
906 ⟶    <groupingobjectId>ipset-5</groupingObjectId>
907 ⟶    <vnincGroupId>external</vnicGroupId>
    </destination>
    <application>
         ┌<applicationId>application-23</applicationId>
         │<applicationId>application-370</applicationId>
         │<applicationId>application-341</applicationId>
910 ⟶│<applicationId>application-416</applicationId>
         │<applicationId>applicationgroup-3</applicationId>
         │<applicationId>applicationgroup-17</applicationId>
         └<applicationId>applicationgroup-42</applicationId>
      <service>
            <protocol>Tcp</protocol>
            <port>any<port>
            <sourceport>any</sourcepoet>
      <service>
   <application>
</firewallRule>
```

FIG. 9

SYSTEM AND METHOD FOR MIGRATING NETWORK POLICIES OF SOFTWARE-DEFINED NETWORK COMPONENTS

RELATED APPLICATIONS

Benefit is claimed under 35 U.S.C. 119(a)-(d) to Foreign Application Serial No. 201941029990 filed in India entitled "SYSTEM AND METHOD FOR MIGRATING NETWORK POLICIES OF SOFTWARE-DEFINED NETWORK COMPONENTS", on Jul. 24, 2019, by VMWARE, Inc., which is herein incorporated in its entirety by reference for all purposes.

The present application is related in subject matter U.S. patent application Ser. No. 16/591,654, U.S. patent application Ser. No. 16/591,662, which is incorporated herein by reference.

BACKGROUND

Virtual routers and edge-gateways form an important part of software-defined networking (SDN) in a cloud computing environment, such as a private, public or hybrid (private and public) cloud computing environment. In a hybrid cloud infrastructure, these SDN components (e.g., routers and edge-gateways) carry more context than just the state of individual configured-services. The context, for instance, also includes the information of the layer at which an SDN component is working and of the peers with which the SDN component is operating. Together, the SDN components form an ecosystem in a cloud computing environment.

Similar to virtual machines, which can be spawned and removed in extremely large numbers, the SDN components can be spun-up or configured on the fly. However, unlike virtual machines, the configurations of SDN components heavily depend on their operating context (e.g., interface configurations, hierarchy, peer-networks and SDN-controller states). While backup-restore or versioning of virtual machines can be achieved in various ways (e.g., changed block tracking (CBT), snapshotting etc.), the same techniques will not work for SDN component configurations due to hugely inter-dependent systems and sub-systems within SDN.

SUMMARY

A system and method for migrating configurations of a software-defined network (SDN) component from a source computing environment to a destination computing environment uses a configuration export file that includes a metadata section and a templates section. The metadata section includes correlation keys for dependencies found in fetched configurations of the SDN component that correspond to dependency keywords in a configurable dictionary. The templates section includes reframed configurations of the dependencies with at least one reference to the correlation keys in the metadata section. At least some correlation-key references within reframed configurations in the templates section of the configuration export file are substituted with correlation-key replacements for the destination computing environment, which are then applied to a target SDN component in the destination computing environment.

A computer-implemented method for migrating configurations of a software-defined network (SDN) component from a source computing environment to a destination computing environment in accordance with an embodiment of the invention comprises fetching configurations of the SDN component at the source computing environment, finding dependencies of the SDN component in the configurations of the SDN component that correspond to dependency keywords in a configurable dictionary, the configurable dictionary including the dependency keywords and paths to find dependencies corresponding to the dependency keywords, for each dependency found in the configurations of the SDN component, calculating a correlation key for the dependency, adding the correlation key for the dependency to a metadata section of a configuration export file, and adding a reframed configuration of the dependency with at least one reference to the correlation key in the metadata section to a templates section of the configuration export file, substituting at least some correlation-key references within reframed configurations in the templates section of the configuration export file with correlation-key replacements for the destination computing environment, and applying the reframed configurations with the correlation-key replacements to a target SDN component in the destination computing environment. In some embodiments, the steps of this method are performed when program instructions contained in a non-transitory computer-readable storage medium are executed by one or more processors.

A system in accordance with an embodiment of the invention comprises memory and at least one processor configured to fetch configurations of the SDN component at a source computing environment, find dependencies of the SDN component in the configurations of the SDN component that correspond to dependency keywords in a configurable dictionary, the configurable dictionary including the dependency keywords and paths to find dependencies corresponding to the dependency keywords, for each dependency found in the configurations of the SDN component, calculate a correlation key for the dependency, add the correlation key for the dependency to a metadata section of a configuration export file, and add a reframed configuration of the dependency with at least one reference to the correlation key in the metadata section to a templates section of the configuration export file, substitute at least some correlation-key references within reframed configurations in the templates section of the configuration export file with correlation-key replacements for a destination computing environment, and apply the reframed configurations with the correlation-key replacements to a target SDN component in the destination computing environment.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

The embodiments of the invention are illustrated by way of example, and not by way of limitation, in the figures of the accompanying drawings in which:

FIG. 7 shows a real example of a configurable dictionary based on REST API syntax for a VMware NSX® virtual router in accordance with one embodiment of the invention.

FIG. 9 shows an example of a partial firewall configuration in XML format from a virtual router in accordance with one embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
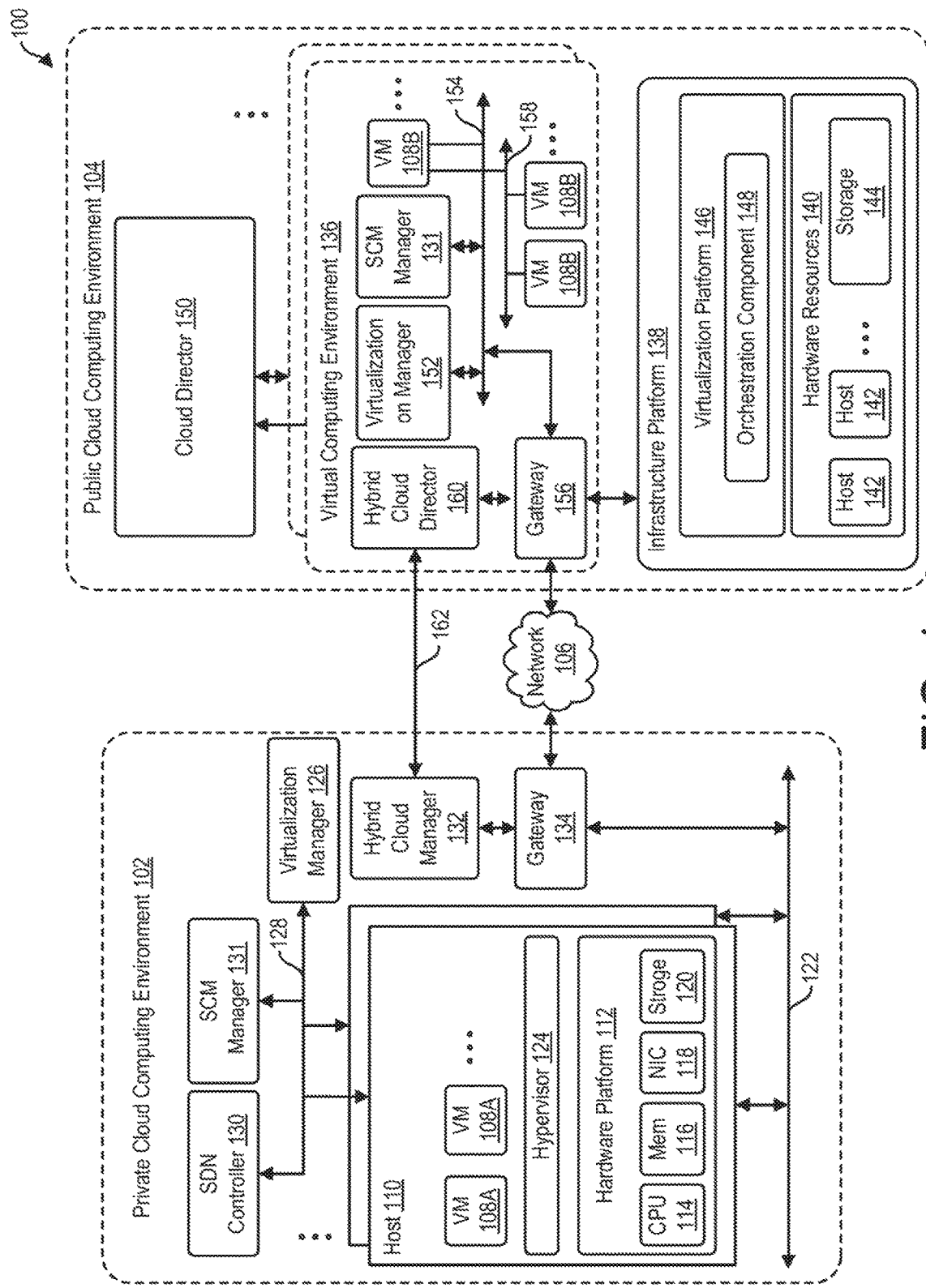
FIG. 1 is a block diagram of a system with a software-defined networking (SDN) component migration (SCM) manager in accordance with one embodiment of the invention.

Turning now to FIG. 1, a block diagram of a computing system 100 in accordance with an embodiment of the invention is shown. The computing system may be a hybrid cloud computing system, which includes at least one private cloud computing environment 102 and at least one public cloud computing environment 104 that are connected to each other via a network 106. The computing system is configured to provide a common platform for managing and executing workloads seamlessly between the private and public cloud computing environments. In one embodiment, the private cloud computing environment may be controlled and administrated by a particular enterprise or business organization, while the public cloud computing environment may be operated by a cloud computing service provider and exposed as a service available to account holders, such as the particular enterprise in addition to other enterprises. In some embodiments, the private cloud computing environment may be a private or on-premise data center. The network 106 can be any type of computer network or a combination of networks that allows communications between devices connected to the network. The network may include the Internet, a wide area network (WAN), a local area network (LAN), a storage area network (SAN), a fibre channel network and/or other networks. The network may be configured to support protocols suited for communications with storage arrays, such as Fibre Channel, Internet Small Computer System Interface (iSCSI), Fibre Channel over Ethernet (FCoE) and HyperSCSI. The license server may be located within the private cloud computing environment or the public cloud computing environment.

The private and public cloud computing environments 102 and 104 of the computing system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

In some embodiments, the computing system 100 supports migration of the virtual machines 108 between the private and public cloud computing environments 102 and 104. The computing system may also support migration of the virtual machines between different sites situated at different physical locations, which may be computing environments in the private and/or public cloud computing environments.

As shown in FIG. 1, the private cloud computing environment 102 of the computing system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other input/output devices such as, for example, a mouse and a keyboard (not shown). The processor is configured to execute instructions, for example, executable instructions that perform one or more operations described herein and may be stored in the system memory and/or the storage system. In some embodiments, the system memory is volatile memory used for retrieving programs and processing data. The system memory may include, for example, one or more random access memory (RAM) modules. The network interface enables the host to communicate with another device via a communication medium, such as a network 122 within the private cloud computing environment. The network interface may be one or more network adapters, also referred to as a Network Interface Card (NIC). The storage system represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system is used to store information, such as executable instructions, cryptographic keys, virtual disks, configurations and other data, which can be retrieved by the host.

Each host 110 may be configured to provide a virtualization layer that abstracts processor, memory, storage and networking resources of the hardware platform 112 into the virtual computing instances, e.g., the virtual machines 108A, that run concurrently on the same host. The virtual machines run on top of a software interface layer, which is referred to herein as a hypervisor 124, that enables sharing of the hardware resources of the host by the virtual machines. One example of the hypervisor that may be used in an embodiment described herein is a VMware ESXi™ hypervisor provided as part of the VMware vSphere® solution made commercially available from VMware, Inc. The hypervisor may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with the hosts 110 via a management network 128. In an embodiment, the virtualization manager is a computer program that resides and executes in a computer system, such as one of the hosts, or in a virtual computing instance, such as one of the virtual machines 108A running on the hosts. One example of the virtualization manager is the VMware vCenter Server® product made available from VMware, Inc. The virtualization manager is configured to carry out administrative tasks for the private cloud computing environment, including managing the hosts, managing the VMs running within each host, provisioning VMs, migrating VMs from one host to another host, and load balancing between the hosts.

In the illustrated embodiment, the private cloud computing environment 102 also includes an SDN controller 130 and an SDN component migration (SCM) manager 131 connected to the management network 128. The SDN controller operates to control SDN networks, e.g., software-defined data centers (SDDCs), in the private cloud computing environment. Thus, the SDN controller manages SDN components, such as virtual routers and edge gateways, in private cloud computing environment to support the SDN networks in the private cloud computing environment. In some embodiments, there may be more than one SDN controller in the private cloud computing environment, which form a SDN controller plane.

The SCM manager 131 operates to allow configurations of SDN components, such as virtual routers and edge gateways, to be migrated from one computing environment to another, e.g., from one SDDC in a computing environment to another SDDC in the same or different computing environment. As used herein, configurations of SDN components may include rules and network policies that are followed or executed by the SDN components. Migration of SDN component configurations allows corresponding SDN components to be readily spawned or deployed in different computing environments, which can properly perform the same tasks as the original SDN components in the new computing environments. As illustrated in FIG. 1, there may be other SCM managers 131 in the public cloud computing environment 104 for multi-cloud application. The SCM manager is described in more detail below.

In one embodiment, the private cloud computing environment 102 includes a hybrid cloud manager 132 configured to manage and integrate computing resources provided by the private cloud computing environment with computing resources provided by the public cloud computing environment 104 to form a unified "hybrid" computing platform. The hybrid cloud manager is configured to deploy virtual computing instances, e.g., virtual machines 108A, in the private cloud computing environment, transfer VMs from the private cloud computing environment to the public cloud computing environment, and perform other "cross-cloud" administrative tasks. In some embodiments, the hybrid cloud manager is a virtual appliance, which may include a collection of applications or services. In one implementation, the hybrid cloud manager is a module or plug-in to the virtualization manager 126, although other implementations may be used, such as a separate computer program executing in any computer system or running in a virtual machine in one of the hosts. One example of the hybrid cloud manager is the VMware® Hybrid Cloud Extension (HCX) HCX™ product made available from VMware, Inc.

In one embodiment, the hybrid cloud manager 132 is configured to control network traffic into the network 106 via a gateway device 134, which may include a virtual appliance. The gateway device 134 is configured to provide the virtual machines 108A and other devices in the private cloud computing environment 102 with connectivity to external devices via the network 106. The gateway device 134 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

The public cloud computing environment 104 of the computing system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage systems 144), and networking resources (not illustrated), and a virtualization platform 146, which is programmed and/or configured to provide the virtual computing environments 136 that support the virtual machines 108B across the hosts 142. The virtualization platform may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment may be VMware cloud (VMC) on Amazon Web Services (AWS).

In one embodiment, at least some of the virtual computing environments 136 may be configured as SDDCs. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one gateway device 156, as well as one or more isolated internal networks 158 not connected to the gateway device 156. The gateway device 156, which may include a virtual appliance, is configured to provide the virtual machines 108B and other components in the virtual computing environment with connectivity to external devices, such as components in the private cloud computing environment via the network 106. The gateway device 156 operates in a similar manner as the gateway device 134 in the private cloud computing environment.

In one embodiment, each of the virtual computing environments 136 in the public cloud computing environment 104 includes a hybrid cloud director 160 configured to communicate with the corresponding hybrid cloud manager 132 in the private cloud computing environment 102 to enable a common virtualized computing platform between the private and public cloud computing environments. In some embodiments, the hybrid cloud manager is a virtual appliance, which includes a collection of applications or services. The hybrid cloud director may communicate with the hybrid cloud manager 132 using Internet-based traffic via a VPN tunnel established between the gateways 134 and 156, or alternatively, using a direct connection 162. The hybrid cloud director and the corresponding hybrid cloud manager facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration. As an example, the hybrid cloud director may be a component of the HCX-Cloud product and the hybrid cloud manager may be a component of the HCX-Enterprise product, which is provided by VMware, Inc.

As explained above, the SCM manager 131 operates to allow configurations of SDN components, such as virtual routers and edge gateways, to be migrated from one computing environment to another. However, unlike conventional systems that include physical as well as logical router backup-tools, which only capture the state of an SDN component being migrated, the SCM manager takes into consideration the state of other components that the SDN components interacts with to provide a more complete context for the SDN component so that the SDN component can properly operate in a new computing environment, which is illustrated in FIG. 2.

Figure 2:
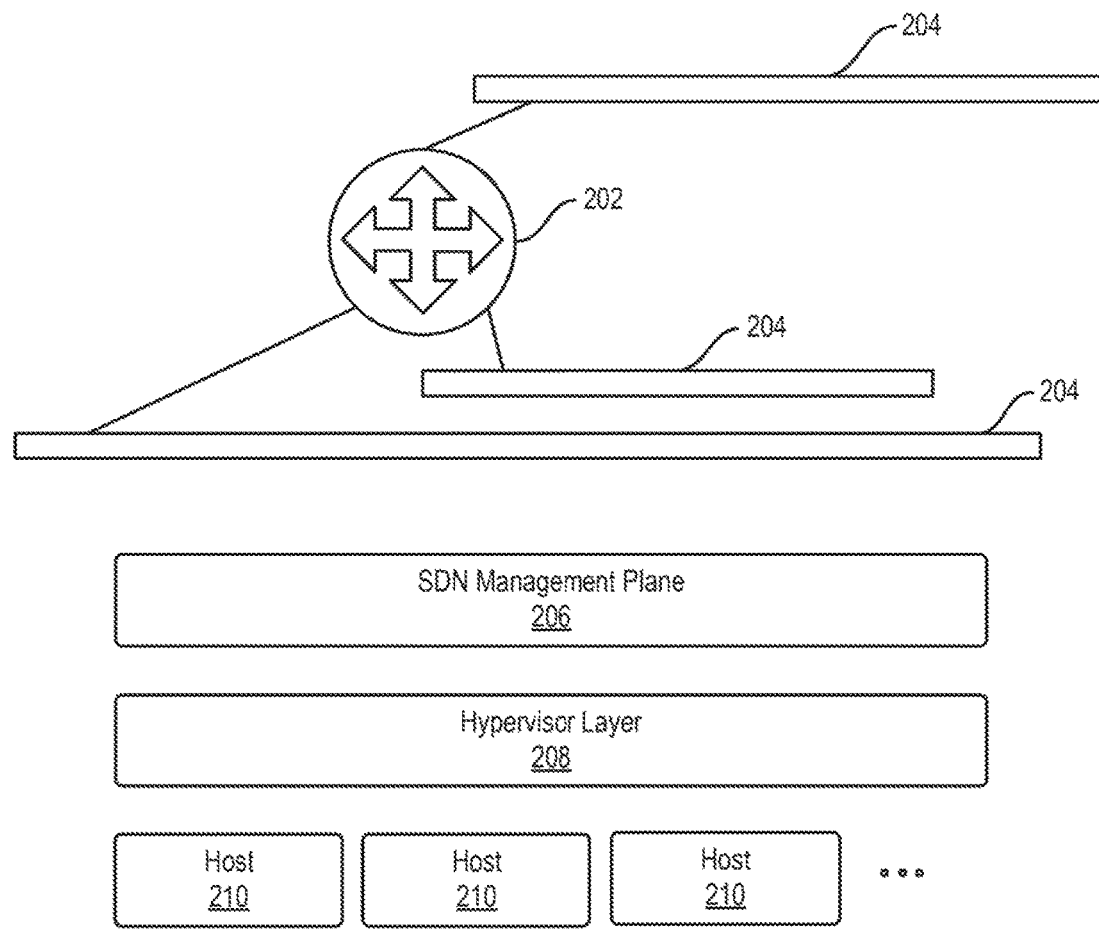
FIG. 2 is a diagram of an SDN component shown with parts of an SDN environment with which the SDN component interacts in accordance with an embodiment of the invention.

As shown in FIG. 2, an SDN component 202 is shown with parts of an SDN environment with which the SDN component interacts. In this example, the SDN component 202 is a virtual router. The parts of the SDN environment with which the virtual router 202 interacts include logical/overlay networks 204, an SDN management plane 206 and a hypervisor layer 208, which resides in different host computers 210. The state of the virtual router 202 includes router configurations and interface configurations, which are typically the only information captured by conventional systems for migrating virtual routers. However, since the virtual router 202 interacts with other parts of the surrounding SDN environment, the state of these SDN parts should also be captured for the virtual router. As illustrated in FIG. 2, the state of the logical/overlay networks 204 includes network configurations, layer 3 (L3) information and virtual local area network (VLAN)/virtual extensible LAN (VXLAN) states. The state of the SDN management plane 206 includes the state of SDN controllers included in the management plane. The state of the hypervisor layer 208 includes network input/output chains. Thus, the state of all these different parts of the surrounding SDN environment should be captured to properly migrate the configurations of the virtual router 202 to another SDN environment.

Currently, there is no system that captures the right context from target SDN components (e.g., virtual routers) as well as the surrounding environment (as illustrated in FIG. 2), and dependency relations between the SDN components and other components in the surrounding environment, so that the services offered by the SDN components at one computing environment, e.g., a source SDDC, could be seamlessly migrated to another computing environment, e.g., a destination SDDC. As an example, for virtual routers, conventional systems operate by taking verbatim backups from all the virtual routers without capturing (1) environment dependencies ("dependency category 1"), (2) peer router contexts ("dependency category 2") and (3) custom SDN constructs ("dependency category 3"). The environment dependencies include subnet and/or networks in which the virtual routers participate, which may include uplink and internal or trunked interfaces, and individual internet protocol (IP) addresses consumed in services, which may include public or internal IP addresses. The peer router contexts include information on the next hop subnets, which may be needed, for instance, in case of border gateway protocol (BGP) or advertised routes, and a list of dynamic routing neighbors. Custom SDN constructs include security groups, which can include references to virtual machines, virtual network interface cards (vNics), cloud infrastructure element (e.g., resource pools, compute clusters, etc.) and other security groups to form a hierarchy, application groups, which usually have references to various application level protocols or protocol groups, and custom grouping objects, e.g., IPSets or IPPools, and MacSets or MacPools.

However, just capturing the entire context surrounding an SDN component, such as a virtual router, is not sufficient to properly migrate that SDN component from the original environment to another environment. What also need to be captured are the correlations amongst the various components surrounding the SDN component so that relevant parameters can be correctly modified and applied as replacements for the SDN component being migrated. The challenges of this solution are illustrated in the following two examples.

The first example illustrates a very specific and simple problem. In this example, a virtual router R1 has uplink to a subnet given by 10.10.10.0/24 and has a firewall rule to "accept" any traffic on "port 8080" from the source IP-range "10.10.10.33 through 10.10.10.200". The goal in this example is to migrate the firewall rule from the virtual router R1 to another virtual router R2 that uplinks to a network with L3 22.22.22.0/24. It is obvious that copying the firewall rule verbatim to the virtual router R2 will not work. Clearly, one has to figure out the fact that there is a correlation between the IP range "10.10.10.33 through 10.10.10.200" and the router-uplink-subnet "10.10.10.0/24". Having figured out the correlation, one needs to correctly substitute out the replacement value, that will work for the virtual router R2. For this example, the dependency correlation and the replacement are shown in the following table.

| Configuration Element | Correlation to | Replacement |
| --- | --- | --- |
| "accept" | None | "accept" |
| "port 8080" | None | "port 8080" |
| IP range: "10.10.10.33-10.10.10.200" | Router uplink | IP range: "22.22.22.33-22.22.22.200" |

This first example illustrates a simple case of "environmental dependencies" leading to a correlation. However, in a real SDN environment, the dependencies would be far more complex, which would lead to complex correlations and replacements.

The second example illustrates the challenges of manually configuring an SDN component (e.g. a virtual router) being migrated from one environment to another. The SDN platform allows a user to specify custom grouping object(s). These grouping objects can be nested within one another; thereby making a hierarchy of custom configuration constructs, which can be viewed as a tree-like structure. While migrating the router configurations, the hierarchy structure must be preserved in the correct order with the new values that would correspond to the destination environment. This makes doing the migration manually, a huge task, which can be quite intimidating and as well error-prone.

Figure 3:
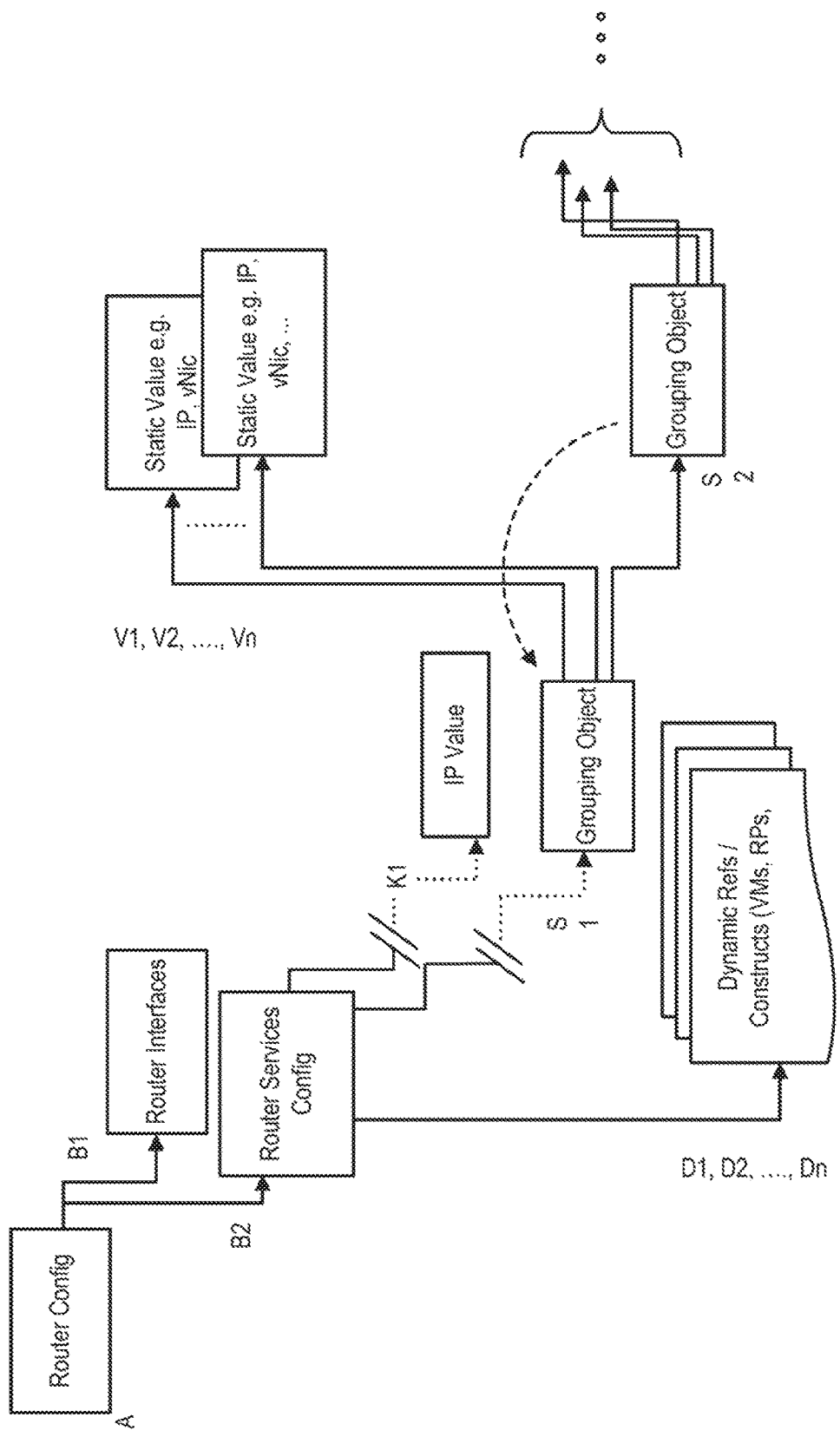
FIG. 3 is a diagram of an example of an SDN component configuration with hierarchy of grouping objects nested within each other in accordance with an embodiment of the invention.

FIG. 3 shows an example of an SDN component configuration with hierarchy of grouping objects nested within each other. As illustrated in FIG. 3, a router configuration can be visualized as a tree 300 of constructs, each representing a dependency that falls under one of the three dependency categories, which were described above. The root of the tree 300 is a router configuration A. The other constructs of the tree 300 include router interfaces B1, a router services configuration B2, dynamic references/constructs D1, . . . , Dn (e.g., virtual machines and resource pools), an IP value K1, grouping objects S1, . . . , Sn, and static values V1, . . . , Vn (e.g., IP values and vNic values). Note that grouping objects can refer to other grouping object, e.g., the grouping object S2 referring to the grouping object S1. Thus, FIG. 3 illustrates the potential complexity of router configurations.

Before describing the solution provided by the SCM manager 131 in depth, some terms used in this disclosure are defined as follows:

Dependency: A portion/component/fragment/part of a particular configuration under inspection of a given SDN component (e.g., a virtual router) that can potentially depend on any of the factors that were listed above as "categories of dependencies".

Dependency Type: A specific type of dependency, e.g. IPSet, MAC-Set, Application Group etc. Each dependency type would fall into one of the categories of dependencies.

Correlation: The way/fashion in which the particular configuration (or the part) under inspection is related to the specific surrounding environment and/or other dependencies. For instance, in the above first example, the correlation can be defined as a function or subroutine that is synonymous to "Firewall→IPRange→first three dotted bytes from the router uplink, concatenated with 0.33 through 0.200". This correlation is sometimes referred to herein as a correlation function.

Replacement. Once the correlations have been discovered, it is helpful to capture the dependencies in terms of a function of surrounding environments, SDN constructs, etc. What is needed next is to replace the parameters of those correlation functions with new values from the target environment and configure them on the destination SDN component (e.g., the destination virtual router). These "new values" are referred to herein as correlation-function parameter replacements, or simply replacements.

The solution provided by the SCM manager is to capture the dependencies and figure out the correlations, and then apply replacements that will work for the target environment. While the solution can be generally applied to any part or combinations of components of SDN component (e.g., virtual routers, networks and topologies), the solution will be described herein for virtual routers. However, the solution is not limited to just virtual routers. The solution may be applied to a single SDN component, multiple SDN components or any network landscape or topology. In addition, a firewall rule of a virtual router is used to illustrate the solution. However, the solution can be applied to any configuration or rule.

Figure 4:
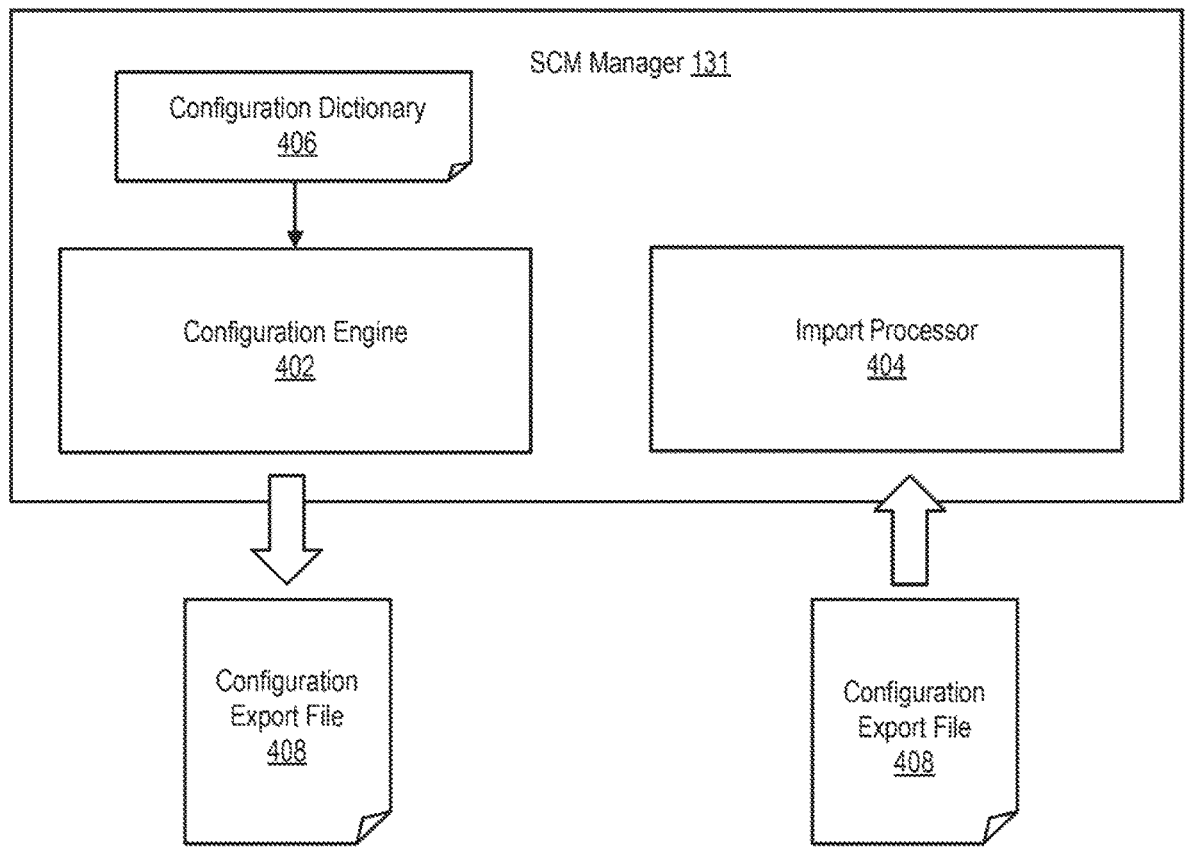
FIG. 4 is a block diagram of the components of the SCM manager in accordance with one embodiment of the invention.

The solution provided by the SCM manager 131 involves two operations, which are performed by components of the SCM manager. The components of the SCM manager 131 in accordance with an embodiment of the invention are illustrated in FIG. 4. As shown in FIG. 4, the SCM manager 131 includes a configuration engine 402 and an import processor 404. The configuration engine 402 performs a context-aware configuration export operation, which is performed using a configurable dictionary 406 to produce a configuration export file 408 for an SDN component. The configuration export file includes the information needed to migrate the configurations of the SDN component from a source computing environment to a destination computing environment using replacements suitable for the destination computing environment. In an embodiment, the configuration export file is a Java Script Object Notification (JSON) file. The configurable dictionary 406 and the configuration export file 408 will be described in detail below.

The import processor 404 performs a configuration import operation, which takes the configuration export file, e.g., the JSON file, as an input and substitutes the replacements and applies the resulting configurations to a target SDN component, e.g., a target virtual router, in the new environment. In some implementations, the import processor 404 and the configuration engine 402 may be executed independently, which allows the user to make different versions of a configuration export file, share the files, perform reviews and make adjustments to the files, before eventually importing the desired configuration export file to the destination.

In some embodiments, there may be more than one SCM manager 131 in the computing system 100. These SCM managers may be located in different SDDCs or different physical sites. As an example, there may be a SCM manager for each SDDC in the computing system so that each SCM manager of an SDDC can execute context-aware configuration export operations to produce configuration export files for SDN components in the SDDC to export configurations of the SDN components to other SDDCs and/or execute configuration import operations to apply configuration export files to SDN components in the SDDC to import configurations of SDN components from other SDDCs to the SDDC.

The context-aware configuration export operation, which is performed by the configuration engine 402, is modeled as a collection of steps, which can be applied over and over as recursive and/or iterative process, on the whole or parts of a given configuration until a point is reached dynamically were all the correlations are figured out. This collection of steps includes a first step, which involves capturing the context (e.g., a set of dependencies), a second step, which involves finding the correlation keys and the correction functions that link the state or configuration of an SDN component, e.g., a virtual router, to the elements in the context, and a third step, which involves extracting the correlation keys in the form of a map called "metadata" in the configuration export file and reframe the state/configuration of the SDN component in terms of those correlation keys in the form of "templates" in the configuration export file. The correlation keys are identified based on the services configured on the SDN component, or a component that defines its state. This collection of steps is referred to herein as a "dependency-externalization" routine.

The most important step in the dependency-externalization routine is the second step, which involves finding the correlation keys, which in turn depends on the ability to detect a potential dependency (or correlation) of the SDN component configuration (or a given part of the configuration). The dependency-externalization routine can be applied to parts of a SDN component configuration iteratively or recursively in a nested fashion. Once executed on the entire configuration, the output of the process would be a configuration export file, such as a configuration export JSON file. An example of a configuration export JSON file is illustrated in FIG. 5.

Figure 5:
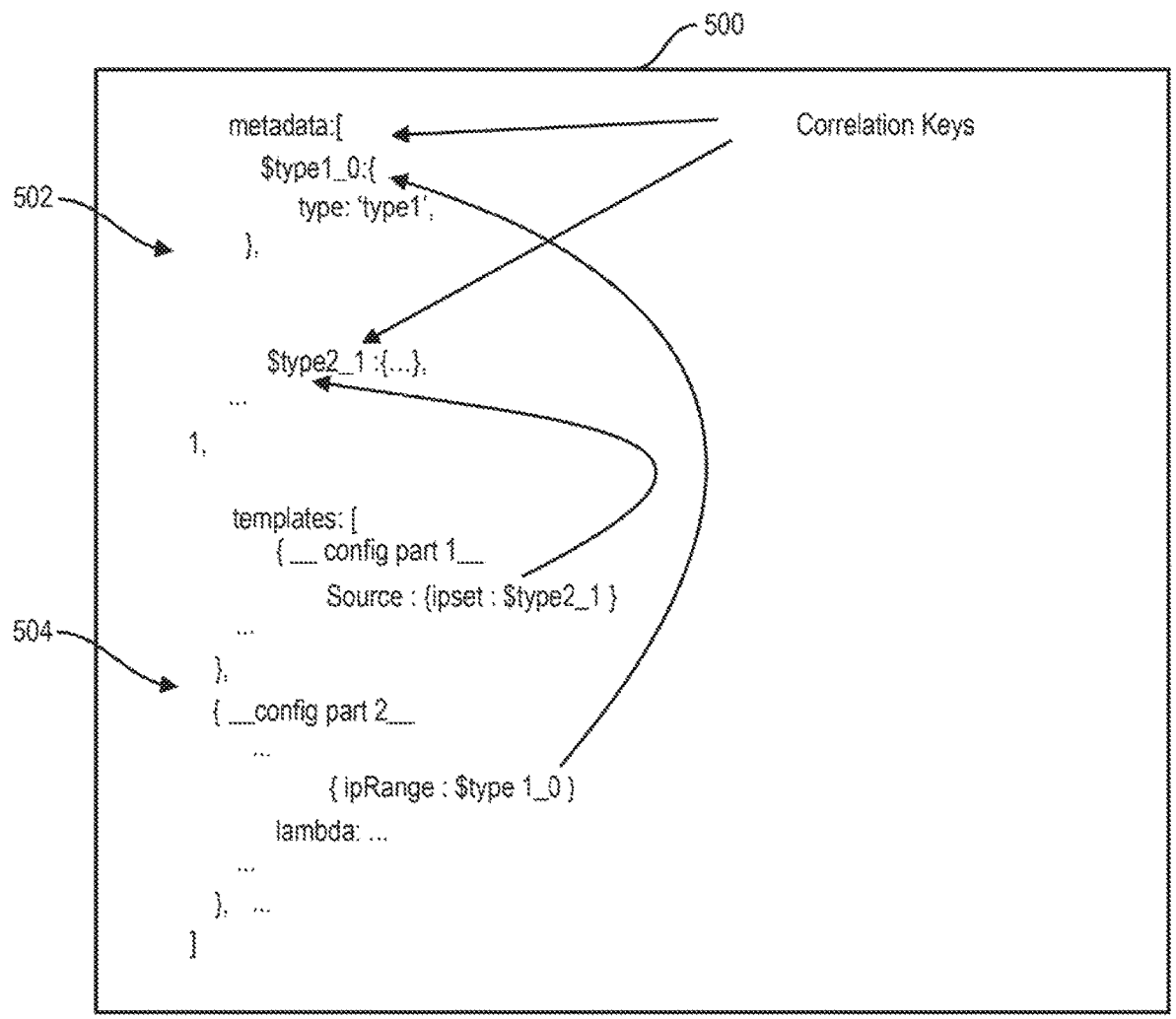
FIG. 5 is a diagram of a configuration export Java Script Object Notification (JSON) file in accordance with one embodiment of the invention.

In FIG. 5, a configuration export JSON file 500 in accordance with an embodiment of the invention is illustrated. In the illustrated embodiment, the JSON file 500 includes a metadata section 502 and a templates section 504. The metadata section includes a list of correlation keys that were generated in the entire process and the dependency types captured using the correlation keys. The templates section includes the reframed configurations or parts of configurations ("templates") with references to the correlation keys in the metadata section, as illustrated in FIG. 5. Original values in these templates are replaced by references to the corresponding correlation keys. The contents in these sections of the JSON file will be further described below.

In order to apply the dependency-externalization routine on the input configuration iteratively and/or recursively, the configurations of an SDN component need to modeled as a multi-fan out tree (also known as "K-ary Tree), which is illustrated in FIG. 3. As noted above, SDN allows a user to form a complex hierarchy of constructs, which are used in the router services and rule definitions for a virtual router. One can use a graphical representation, as illustrated in FIG. 3, to visualize those constructs and other dependencies for an SDN component.

As illustrated in FIG. 3, a router configuration forms a tree of constructs, each representing a dependency that falls under one of the three dependency categories. The main intent of this graph-based modeling is to allow the recursive/iterative application of the dependency-externalization routine in finite states, for a router configuration that can be very large or boundless. Graph models allow traversal search algorithms, e.g., a depth-first search and a breadth-first search. Thus, this modeling is important for the solution.

The modeling is realized as a configurable dictionary, which will be used for dependency-externalization routine performed by the configuration engine.

Figure 6:
FIG. 6 shows a generic configurable dictionary in accordance with one embodiment of the invention.

The configurable dictionary, such as the configurable dictionary 406, is like a rule book, which tells the configuration engine 402 what to look for and what to do when it is found. An example of a generic configurable dictionary is illustrated in FIG. 6. In the example shown in FIG. 6, a generic configurable dictionary 600 includes a keyword$_A$, action and dependencies. The keyword$_A$ represents vendor-specific construct (e.g., dfw, ipset, ip, securitygroup, vm, . . . ) and action, if unspecified, defaults to fetching the definition of keyword$_A$, for example, using REST API, using the identification (ID) in case of object, or finding the correlation function, e.g., the lambda, if the keyword$_A$ is a primitive/atomic value (e.g., an IP address). The action also encapsulates API endpoint details. Each dependency is a list of structs {subType, xpaths}, where each struct specifies the sub-component that should be searched for, within the definition of keyword$_A$. For instance, within the keyword "ipset", there would be dependency struct with subType "ip". The XPaths specify the potential locations a keyword$_{Bi}$ could exist within the definition of keyword$_A$. The configurable dictionary contains entries for each of the keyword$_{Bi}$. In operation, the configuration engine 402 would execute the dependencies recursively until finish. The dictionary has a default entry "init" which specifies dependencies to the first level constructs, from which the configuration engine 402 will begin the execution. A real example of a configurable dictionary based on REST API syntax for a VMware NSX® virtual router is illustrated in FIG. 7. The design of the configurable dictionary allows the processors in the SCM manager 131 to be independent of vendor specific syntax. Thus, by enhancing the dictionary, the processors learn to act on any SDN provider syntax.

The three steps of the dependency-externalization routine, which is executed by the configuration engine 402, will now be described in more detail. It is noted here that the routine can be applied to the entire configuration of an SDN component, such as a virtual router, or a part of the SDN component configuration.

The first step of the dependency-externalization routine involves finding the dependencies of the SDN component and capturing the context of the SDN component in the current computing environment. Since the virtual configuration (along with its ramifications) can be modeled in a tree fashion, the dependencies can be located at well-defined paths from the root. For instance, in FIG. 3, the path "/A/B2/ . . . K1" represents the location of a dependency "IP Value". Thus, there is a set of predefined paths, for each dependency type (as specified above), that can be iterated over the tree to find the list of all dependencies. This works because, within a service configuration, where to exactly find a particular dependency type is known.

In an embodiment, the configuration engine 402 maintain a global context, which is an execution-time structure, and is like a lookup table of dependency details. The global context is a runtime embodiment of surrounding context of the SDN component. Once the configuration engine 402 has identified a dependency, the relevant details can be fetched from the underlying SDN systems, e.g., the SDN controller 130, based on its type. The dependency can then be added to the global context, and keyed by a correlation key. As the configuration engine 402 continues to find new dependencies, this context gradually evolves, and eventually forms the metadata section in the configuration export file.

In an embodiment, the configuration engine 402 uses XPath to ensure that deeply nested and repeating structures are defined using "//" (or descendant location path), even if the repeating structures have fixed or absolute paths. The use of XPath allows the location or a list of locations of a dependency in a potentially unbounded configuration to be precisely defined.

The second step of the dependency-externalization routine involves finding the correlation keys. Once a dependency within a construct is identified by following a known path, a key needs to be created and added to the context so that the dependency can be referred to any time in the future. In an embodiment, to guarantee uniqueness, the key format may be: $<dependency_type>_<unique_global_index>. The unique_global_index is a counter for each dependency-type that can be incremented each time (i.e., each iteration of the dependency-externalization routine) to guarantee uniqueness.

The third and last step of the dependency-externalization routine involves reframing the configuration (or part of it) of the SDN component. This step involves replacing the actual occurrences of dependency values (which were found in the first step) with the corresponding correlation keys. This is a mechanical process. However, in many cases, the correlation keys may not be a direct text replacement, but a transformation of text, before the replacement. As used herein, text may include alphanumeric characters and symbols. This text transformation is the correlation function that is captured in the metadata and templates sections of the configuration export file as "lambda".

As the correlation between a configuration fragment (or a construct within it) and a surrounding environment subject (e.g., a router interface, or any subject within the three, defined dependency categories) is found, the correlation function in the form of substitutions is determined. As noted above, the replacements specified by a correlation function may not be a direct text replacement. In fact, in most cases, it would be a transformation of the subject value. Finding a correlation function is an important part of the dependency-externalization routine. For the rest of the dependency types, there are only identity functions, i.e., functions that returns same value as input. As an example, IPAddress is a dependency type where there are a few functions that will perform IP-Octet manipulations based on the input IP Address and the subnet-prefix-length of the router interface.

There are multiple options currently available to specify a correlation function in text-format that can be subjected to an evaluator when the actual transformation is to happen (i.e., during a configuration import operation). As an example, these options include function specification techniques that can be used by JSEvaluator, ECMAEvaluator and Java8-Lambda.

In an embodiment, the correlation functions remove vendor-specific formats and/or constructs. The correlation functions (e.g., lambdas) help capture the transformational specification of a construct in terms of inputs that are vendor neutral. The advantage of having "lambdas" is that the inputs can be tweaked as per vendor-specification, and the execution can be deferred to a later point of time, until the inputs are available. This allows the transformational dependencies to be captured in the dictionary; thereby providing vendor-neutrality to the processors in the SCM manager 131.

The dependency-externalization routine is executed as part of the context-aware configuration export operation by the configuration engine 402 of the SCM manager 131. The context-aware configuration export operation is a recursive (or multi-level) execution of the dependency-externalization routine that builds the stack of the dependent configurations and sub-configuration and a list of correlation keys in a configuration export file. In an embodiment, the stack of the dependent configurations and sub-configuration is built in the templates section of a JSON file and the list of keys is built in a metadata section of the JSON file. The number of levels of a recursive execution would depend on the levels (or depth) of nesting supported by the SDN. At the completion of the context-aware configuration export operation, a single configuration export file, e.g., a JSON file, is generated with all the dependencies extracted as correlation keys within a section of the configuration of the output file, e.g., the metadata section of the JSON file.

Figure 8:
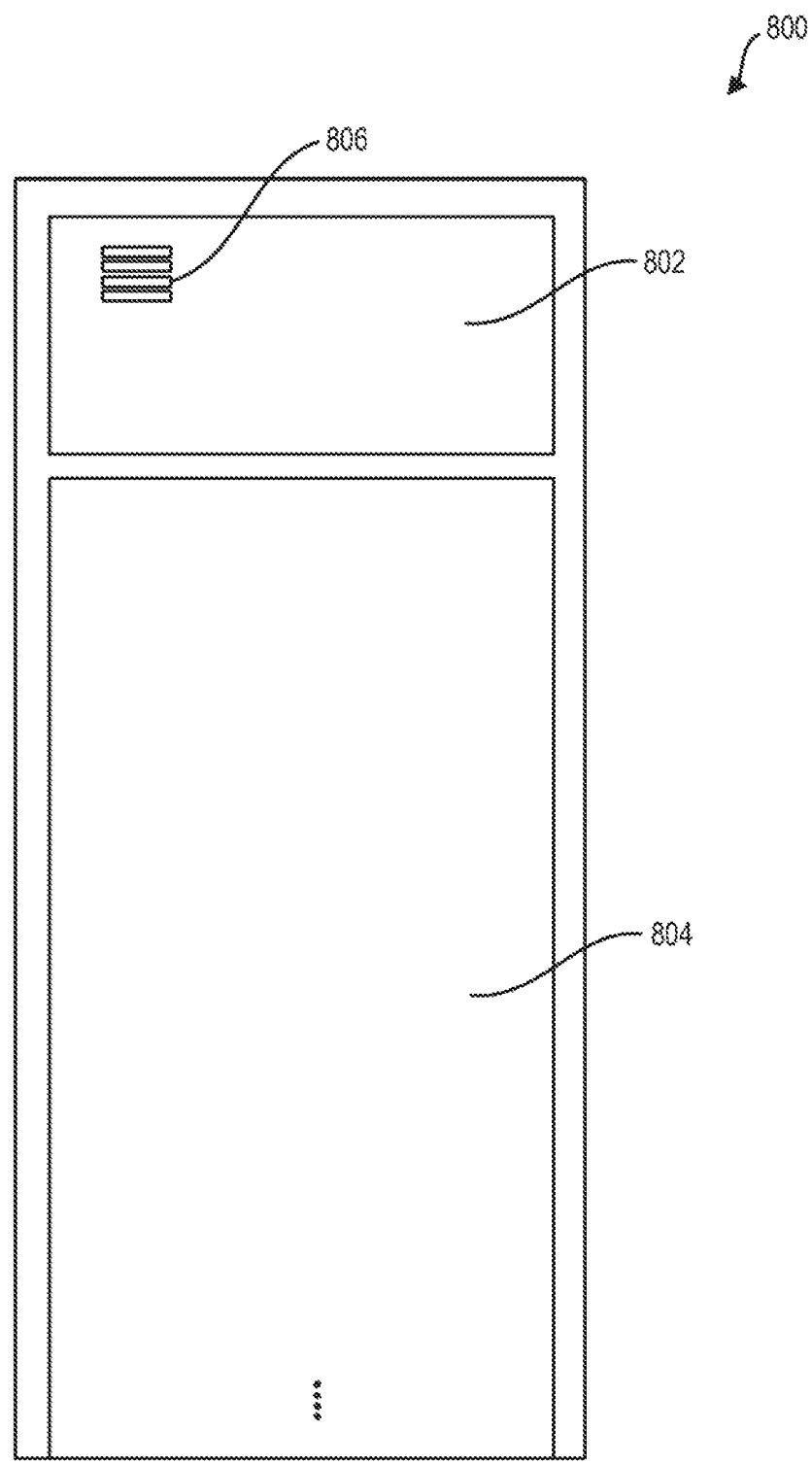
FIG. 8 is a block diagram of a configuration export JSON file in accordance with one embodiment of the invention, which illustrates relative spaces occupied by metadata and templates sections of the JSON file.

In the embodiment where the configuration export file is a JSON file, the metadata section occupies a very small portion of the JSON file, which is illustrated in FIG. 8. As shown in FIG. 8, a JSON file 800 includes a metadata section 802 and a templates section 804. The metadata section occupies significantly less space than the templates section. In some implementations, the metadata section occupies only 10% (or less than that) of the overall space of the JSON file (or less if the JSON file is large), where a user has to look to supply unmapped keys and/or keys that are flagged for user input. Thus, a minimal space in the metadata section will be used for user input 806. This reduces the time and effort for any client, for example, a user interface, a software tool or a user, that would accept the JSON file as input and prompt/supply the unmapped key values.

The configuration import operation, which is performed by the import processor 404 of the SCM manager 131, is executed on the target environment, which may be a destination SDDC. The input for the configuration import operation is a configuration export file, e.g., a JSON file, with a minimal set of user inputs supplied in the metadata section of the configuration export file. The user inputs are very minimal set of mappings between the constructs that cannot be automatically deduced during the export operation. Using a virtual router as an example of an SDN component used for configuration migration, these may include (1) the corresponding destination router(s) against the source router(s) from where the configurations would be migrated, (2) the corresponding destination networks (e.g., port groups, VLANs, VXLANs) for the source networks, (3) passwords or secret keys, which cannot be captured in the export operation for security considerations (which may be supplied by the user when prompted during the import operation, and (4) any information that is beyond the purview or context of the configurations/services/topology being migrated. If the user does not provide these values, it will be treated an error case and a prompt will be issued for the user.

Requiring user input for the import operation does not diminish the advantage offered by the various embodiments of invention. First, the set of information required by the user is minimal, as compared to the bulk of dependencies that are deduced using the power of recursive dependency-externalization routine combined with the correlation function. In fact, the embodiments of the invention bring down the number of user inputs and/or interventions required, from a potentially unbounded order to a very few. Second, there is no need to try to automatically resolve something that the user has knowledge about and cannot be deduced automatically. Third, the place where the user input would be required is limited to only 10% or less of the configuration export file, e.g., a JSON file, within the metadata section, which may be right at the top/head of the file. This allows a tool/UI/user consuming the file to avoid reading rest (i.e., 90%) of the large configuration export file.

The configuration import operation is a two-step operation, which includes a step of substituting replacement values and a step of sequential application of the configurations. The first step of substituting replacement values involves substituting the new values (or replacements) based on the dependency type against the correlation key in the metadata. For scalar values (e.g., IP address or "IPAddress"), the import processor 404 will figure out the corresponding replacement from the destination environment based on the dependency type. For IP address, for instance in the example of a virtual router, its correlation with the router interface has already been captured in the metadata section of the configuration export file. Given the corresponding router interfaces in the destination side, the import processor can figure out the replacement value for the IPAddress. This step assumes a very bare-minimum set of inputs from the user to map the rest of the set in the metadata section.

In cases where a dependent configuration is required (e.g., for IPSets, Custom Grouping Objects etc. . . . ), the same has to be first created with its corresponding correlation keys replaced, on the destination side. This is performed in the next step of the configuration import operation.

The configuration export file, e.g., a JSON file, has a stack of configurations and/or configuration parts with references to keys in the metadata section. The top of the stack represents the most independent configuration or part. In the second of the configuration import operation, the import processor 404 executes the following process. For each template entry in the configuration export file from top to bottom one-by-one, until all correlation keys (i.e., instances with "$xyx_<digit>" pattern) are substituted in the template entry, the following two sub-steps are executed by the import processor. In the first sub-step, the import processor looks up the correlation key in the metadata section, and finds the dependency type and the corresponding correlation function, e.g., the corresponding lambda. If the correlation function input contains another correlation key due to a chain of dependencies, then the import processor executes first sub-step again in a recursive fashion for the new correlation key found in the correlation function. Otherwise, the import processor picks the replacement from the user supplied mappings between the source environment and destination environment. If no such mapping is found, the import processor handles it as an error scenario, which is described below. In the second sub-step, the import processor substitutes the correlation keys with a new value obtained by applying the correlation function on the replacement obtained from the first sub-step.

After all the correlation keys have been substituted with new values, the import processor 404 applies the reframed configuration to the corresponding destination SDN component. In an embodiment, the import processor may use an adapter (not shown) to translate at least some of the rules defined in the configuration appropriately for the destination infrastructure.

As noted above, there may be very rare cases where a configuration or a configuration part may be externalized as correlation key (e.g., due to XPath execution) but may not correspond to any construct or subject on the destination side. This may be due to some erroneous configurations, which were made by the user in the past, but resulted in no malfunction, and thus, left undetected. Such cases would require a user prompt to resolve the issue. In an embodiment, the import processor 404 may put a marker in the metadata section of the configuration export file against the correlation key. The user may choose to ignore, fix or supply replacements for those keys for the new environment, before the import operation is executed. Thus, the embodiments of the invention do not try to auto-fix a genuine problem with the source configuration, but rather leave it to the user who better knows how to handle existing erroneous configurations. However, the embodiments of the invention do prompt the user if there exists a problem in the configuration.

Turning now to FIG. 9, an example of a partial firewall configuration 900 in XML format from a virtual router in accordance with an embodiment of the invention is depicted, which shows that dependencies do exist at specific locations in a given configuration. This configuration is exemplary, but can be applied in general for any configuration, as the abstractions used in the solution are generic. First thing to note is, the configuration automatically conforms to a tree format due to the inherent property of JSON or XML. The configuration would be the subject for the application of dependency-externalization routine at the first level, where a level indicates the depth of the recursive execution. Each dependency for a given configuration can be found at a specific location, represented by the XPath from the root of the configuration. These XPaths ensure a unique way to find all possible dependencies of a given type, in a potentially infinitely large configuration. It may also be noted that a XPath application is not restricted to configurations defined by XML; it may be applied to any configuration script that follows a tree structure. The use of XPath brings execution efficiency in the processors because XPath operates on a tree and can locate constructs from a deeply nested and potentially unbounded set of configurations by applying a finite-state-machine mechanism.

In FIG. 9, constructs 902 and 908 represent dependencies that are values, and need to be mapped to a value or a derivative of it by applying a correlation function. Such dependencies are in the dependency categories of environment dependencies (category 1) and peer contexts (category 2). In the example shown in FIG. 9, both dependencies 902 and 908 map to router interface, and thus, fall under the category of environment dependencies (category 1). Constructs 904, 906 and 910 are dependencies that represent an object ID corresponding to a custom construct defined in the SDN layer (category 3). For the dependencies in category 3, the corresponding object state and configuration need to be fetched from the SDN layer, followed by the reapplication of the dependency-externalization routine recursively, thereby adding more levels, per nested structure, until all the dependencies are processed. Each dependency type would have a predefined set of XPaths. Note that there could be more dependencies than indicated in FIG. 9, such as "ruleTag". However, those would be treated the same way as the ones shown above. For brevity, only the best representative dependencies have been described to illustrate all cases.

In the illustrated example, the construct 902 is represented by XPath: "/firewallRule/source/ipAddress", where the dependency type is "ipAddress", the correlation function is "transformation function or lambda with input as the router-interface IP-subnet, output as the IP-address value", and the correlation key is $ipAddress_0. The construct 902 is not recursive (the dependency represents a value). The constructs 904 and 906 are represented by XPath: "//groupingObjectId", where the dependency type is "groupingObject", the correlation function is "identify function that returns the input value as output", and the correlation keys are $groupingObject_0 and $groupingObject_1. The constructs 904 and 906 are recursive (the dependency represents a custom objectID whose state exists in the SDN layer—need to query SDN and pull Object configuration represented by "dvportgroup-64 and recursively apply the dependency-externalization routine). The construct 908 is represented by XPath: "//vnicGroupId", where the dependency type is "vNic", the correlation function is "identify function—given the router/Edge vNic, it will be directly substituted on the target router/environment", and the correlation key is $vNic_0. The construct 908 is not recursive. The constructs 910 are represented by XPath: "//applicationID", where the dependency type is "applicationGroup", the correlation function is "identify function that returns the input value as output", and the correlation keys are $applicationGroup_0, $applicationGroup_1, $applicationGroup_2 . . . $applicationGroup_6. The constructs 910 are recursive (need to query SDN and pull Object configurations represented by ["application-12", . . . , "application-group-42" and recursively apply the dependency-externalization routine on each of those).

Figure 10:
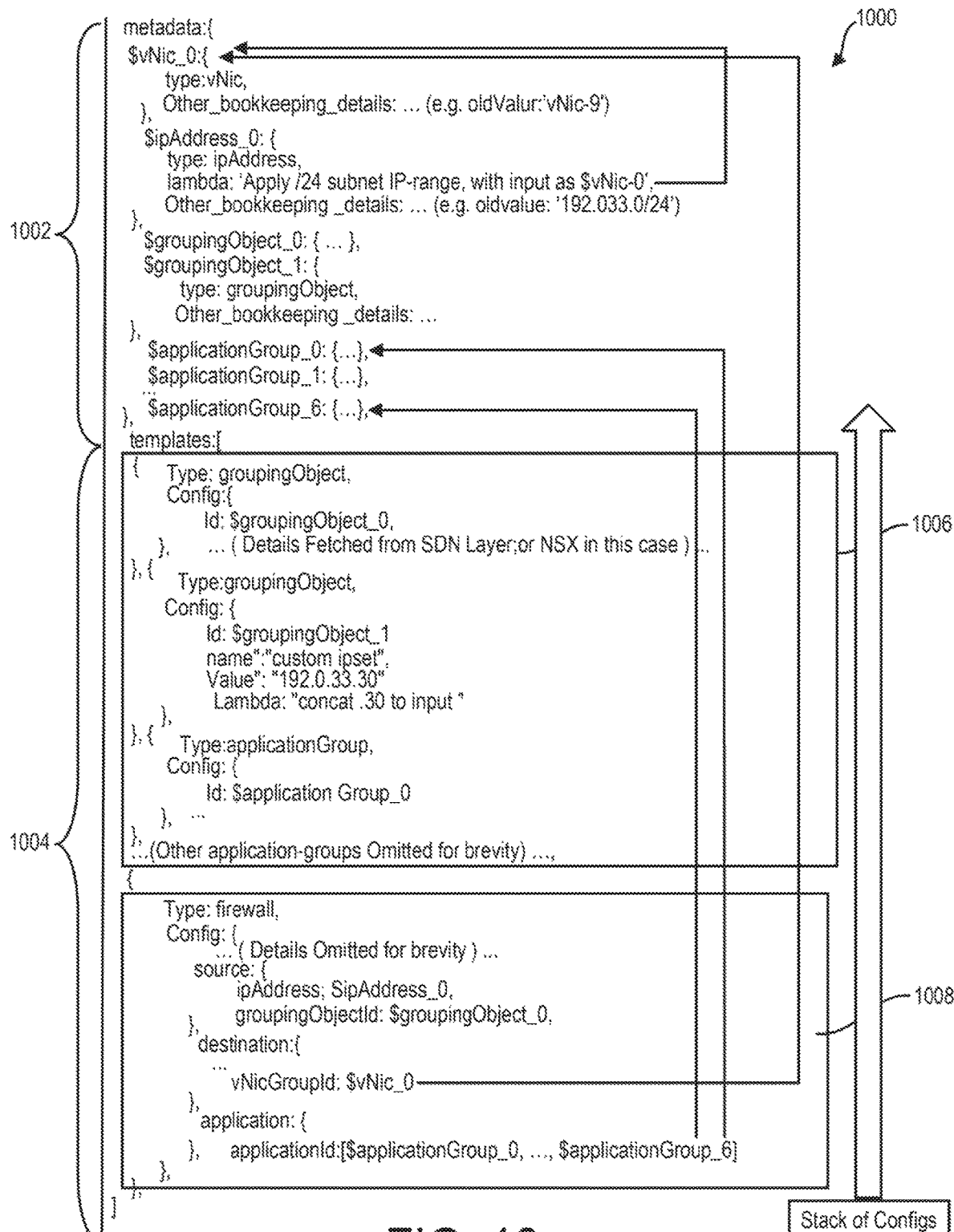
FIG. 10 shows a configuration export file in JSON format that is produced after the application of a dependency-externalization routine on the first level of the configuration shown in FIG. 9 in accordance with an embodiment of the invention.

Turning now to FIG. 10, a configuration export file in JSON format that is produced after the application of the dependency-externalization routine on the first level (level 1) of the configuration 900 of FIG. 9 in accordance with an embodiment of the invention is shown. As shown in FIG. 10, the configuration export file 1000 includes a metadata section 1002 and a templates section 1004, which includes a stack of configurations, such as stack sections 1006 and 1008. As illustrated by the stack section 1006, the original firewall configuration has been reframed with references to the correlation keys in the metadata section 1002. As illustrated by the stack section 1008, new configurations have been pulled from the SDN for each of the dependencies found at level 1. Now, each of these will be subjected to the next level, i.e., level 2 execution of the dependency-externalization routine.

Note that, while FIG. 9 shows the configuration in XML, the structure can be exported as a JSON file, as illustrated in FIG. 10. In fact, many SDNs provide APIs that provide configuration in JSON, which contain constructs and values (e.g., interface, IP Address, Source, Destination, maximum transmission unit (MTU), etc.) that are fairly generic across all the providers and vendors. For optimization, the "lambda" can be omitted in cases of identify functions. Also note that not all references to correlation keys have been indicated using arrow in FIG. 10.

For the next level (level 2), the dependency-externalization routine is executed for each of the new constructs in the stack section 1008. In general, the execution levels would continue, thereby causing the stack of configurations to grow upwards, as indicated, until there is a state where all the dependencies are elementary values (i.e., non-custom constructs). In the above example, the execution will stop at level 2. It is important to note that the innermost constructs in the nested configuration would come at the top in the templates section of the configuration export file 1000, which are the independent constructs. These independent constructs are then followed by the dependent constructs with the original constructs being at the bottom of the stack of configurations. Thus, during the configuration import operation, the most independent construct would be applied first at the target computing environment.

Figure 11:
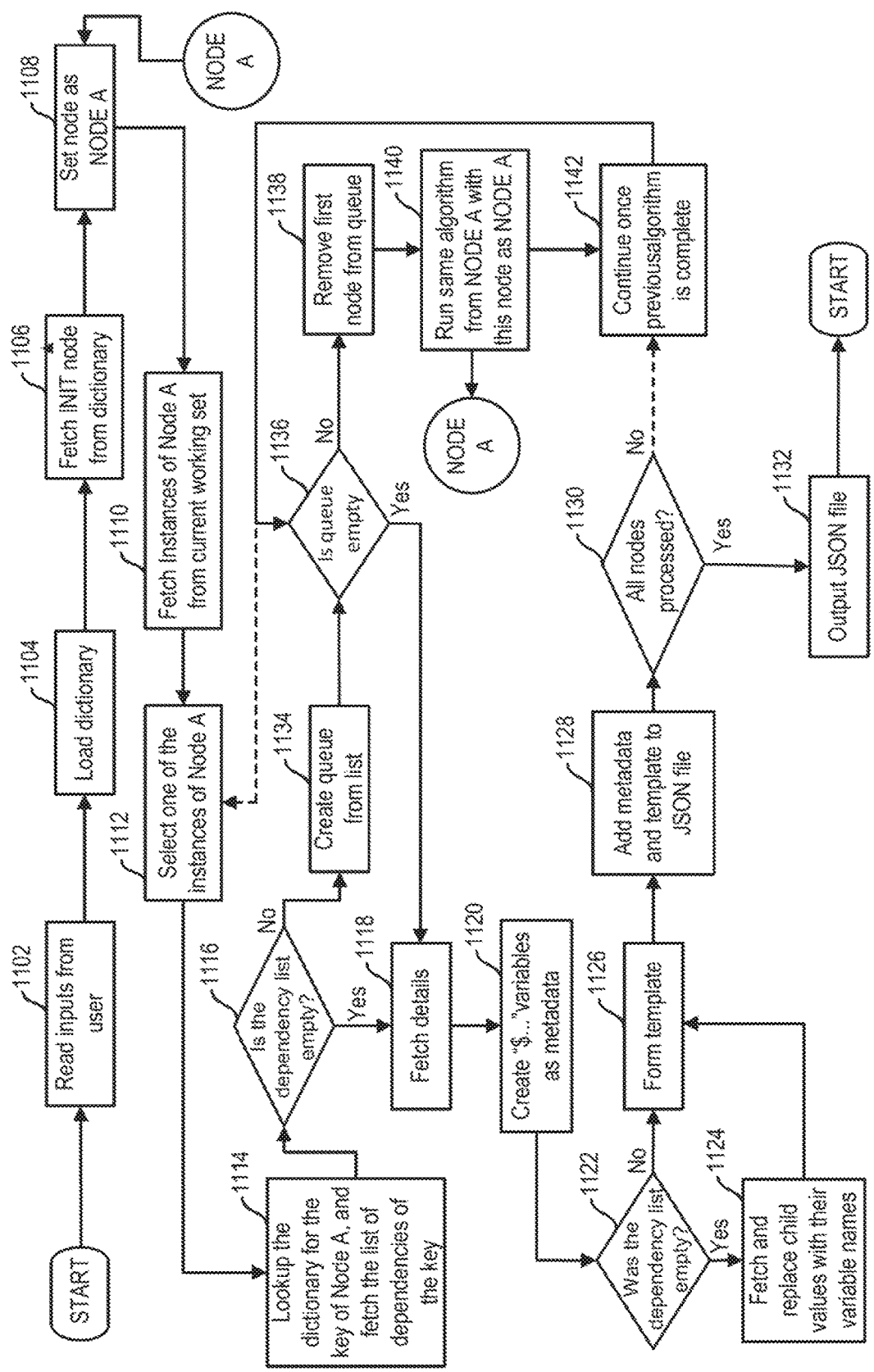
FIG. 11 is a process flow diagram of an operation of a configuration engine of the SCM manager to produce a configuration export file for an SDN component in accordance with an embodiment of the invention.

The operation of the configuration engine 402 of the SCM manager 131 to produce a configuration export file for an SDN component in accordance with an embodiment of the invention is described with reference to a process flow diagram of FIG. 11. As shown in FIG. 11, the operation begins at block 1102, where user inputs are read by the configuration engine. The user inputs can include: VLAN ID, IP address (if uncorrelated to any underlying network or VLAN), VM ID, storage ID, application ID, rule ID, service ID certificate ID, etc.

Next, at block 1104, the configurable dictionary is loaded by the configuration engine 402. The configurable dictionary may be retrieved from a storage that is accessible by the configuration engine.

Next, at block 1106, the configurable dictionary is read to fetch the first node, e.g., the "init" node, as a node to be processed. As used herein, nodes of the configurable dictionary include keywords and dependencies. Next, at block 1108, the current node is designated as Node A to be processed.

Next, at block 1110, instances of Node A are fetched from current working set of configurations for the SDN component. Next, at block 1112, one of the instances of Node A is selected to be processed. Next, at block 1114, a lookup operation is performed on the dictionary for the key of Node A and the list of dependencies of the key is fetched.

Next, at block 1116, a determination is made whether the list of dependencies that are applicable to current Node A instance is empty. If yes, then the operation proceeds to block 1118, where details of the current Node A key are fetched. The details of the current Node A key, which include configurations, are fetched from the underlying system or infrastructure (e.g., SDN and/or SDDC), following the instructions in the dictionary for the key. Next, at block 1120, "$ . . . " variables are created as metadata. As used herein, the "$ . . . " variables are the correlation keys, as described above.

Next, at block 1122, a determination is made whether the list of dependencies was empty. If no, then the operation proceeds to block 1126, where a "form template" operation is performed, and the resulting template is stacked up at the top of existing templates. The "form template" operation is a subroutine to remodel the fetched configuration using the corresponding "$ . . . " variable from the metadata. If yes, then operation proceeds to block 1124, where child dependency values are fetched and replaced with their variable names, before the template is formed, at block 1126.

Next, at block 1128, the metadata and the stack of templates are updated in the configuration export file, e.g., the configuration export JSON file. Next, at block 1130, a determination is made whether all the nodes have been processed, which will be when all the instances of Node A algorithms have been completed. If yes, then the operation proceeds to block 1132, where the configuration export file is output. The operation then comes to an end. However, if no, then the operation proceeds to block 1142.

Turning back to block 1116, if the list of dependencies that are applicable to current Node A instance is not empty, the operation proceeds to block 1134, where a queue is created from the list. Next, at block 1136, a determination is made whether the queue is empty. If yes, then the operation proceeds to block 1118. If no, then the operation proceeds to block 1138, where the first entry is removed from the queue.

Next, at block 1140, the same algorithm for Node A is executed with this entry as Node A. Next, at block 1142, the operation is continued after the previous algorithm is complete. The operation then proceeds to block 1136 to see if more nodes are in the queue. If the previous algorithm completes the process for an instance of Node A, the operation proceeds back to block 1112, where another instance of Node A is selected to be processed.

In one implementation, the configuration engine 402 of the SCM manager 131 may execute the following algorithm to produce a configuration export file for an SDN component. This algorithm is described with reference to the configurable dictionary 600 shown in FIG. 6. Whenever, the configuration engine finds a keyword$_A$ in a fetched configuration, the confirmation engine will:

1. lookup the dictionary entry for keyword$_A$
2. IF there is already an entry in the metadata section corresponding to the input ID/value, GOTO step 5. ELSE continue to step 3.
   (the input ID/value is passed on as input parameter by a previous processor thread)
3. IF the ID is an object reference,
   THEN fetch the configuration with the ID (executing the action obtained from step 1).
   ELSE, find the lambda (e.g. for IP address)
4. Add a metadata entry, with a new placeholder name as ${keyword$_A$_UUID} and its value as the ID.
5. for each entry i in dependencies list, do
   a. execute the xpaths on the fetched configuration, which outputs a list of new IDs (or values), of size J (J>=0).
   b. For each such value/ID obtained in step 5.a (call it IDij), recursively invoke (concurrent) processor thread for keyword$_{Bi}$ with input as IDij.
   c. collect metadata from each of the child (concurrent) invocations.
6. Replace IDs or values with ${keyword$_A$_UUID} from step 5.c In this implementation, the configuration engine 402 begins execution with the "init" keyword from the configurable dictionary with an empty metadata and recursively builds up entire content for the configuration export file.

Figure 12:
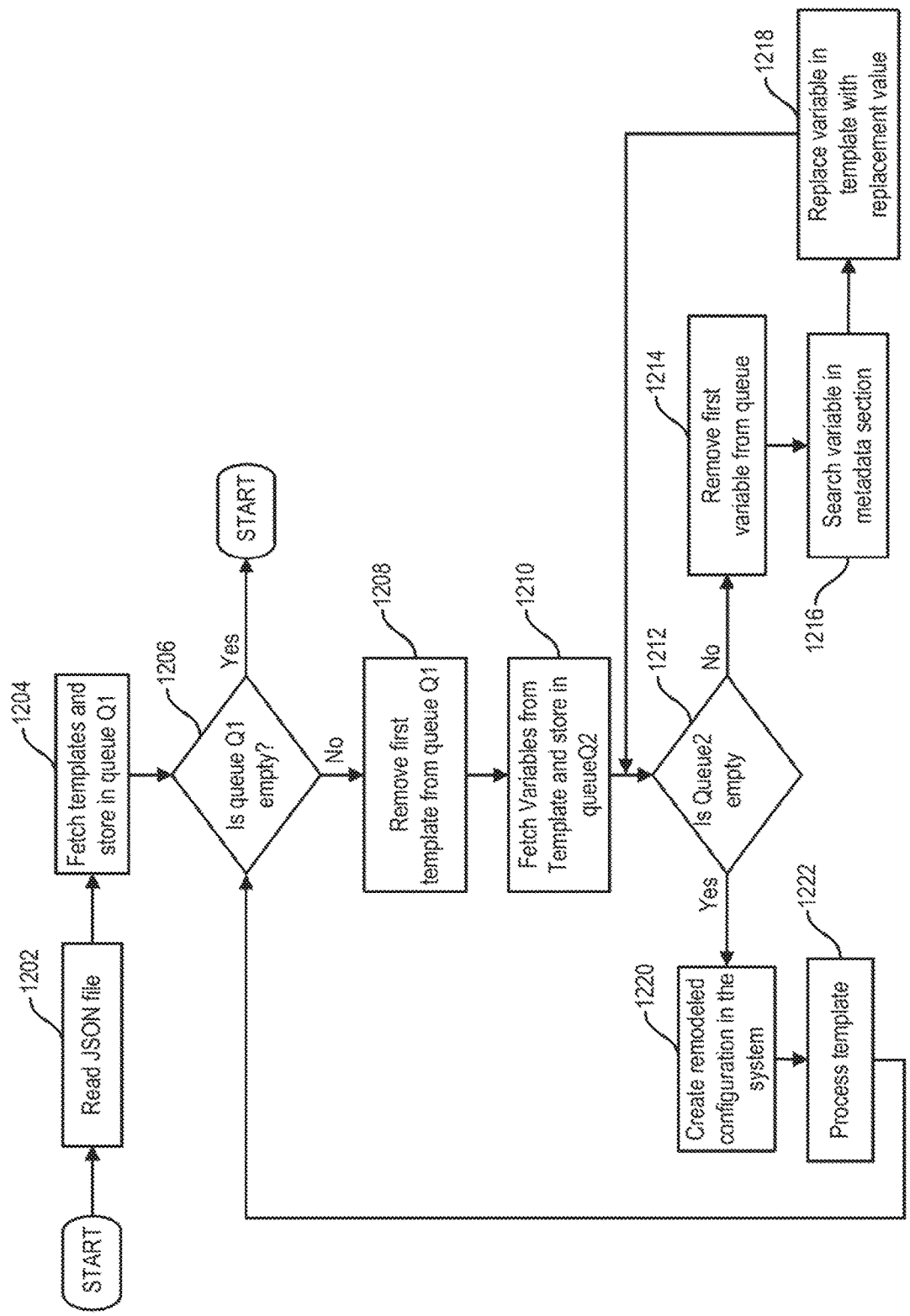
FIG. 12 is a process flow diagram of an operation of an import processor of the SCM manager to apply the configuration of an SDN component in a destination computing environment using a configuration export file in accordance with an embodiment of the invention.

The operation of the import processor 404 of the SCM manager 131 to apply the configuration of an SDN component in a destination computing environment using a configuration export file in accordance with an embodiment of the invention is described with reference to a process flow diagram of FIG. 12. As shown in FIG. 12, the operation begins at block 1202, where the configuration export file, e.g., a configuration export JSON file, is read by the import processor.

Next, at block 1204, the confirmation templates in the configuration export file are fetched and stored in queue Q1. Next, at block 1206, a determination is made whether the queue Q1 is empty. If yes, then the operation comes to an end. If no, then the operation proceeds to block 1208, where the first template is removed from the queue Q1.

Next, at block 1210, variables from the template are fetched and stored in queue Q2. Next, at block 1212, a determination is made whether the queue Q2 is empty. If no, then the operation proceeds to block 1214, where the first variable is removed from the queue Q2. Next, at block 1216, a search is performed to lookup the variable in the metadata section of the configuration export file to find a replacement value associated with the variable. Next, at block 1218, the variable in the template is replaced with the replacement value. The operation then proceeds back to block 1212 to see if the queue Q2 is empty.

If the queue Q2 is empty, then the operation proceeds to block 1220, where remodeled configurations are created in the destination system, which may be IaaS and/or SDN. These remodeled configurations are obtained by substituting at least one variable from the metadata with the corresponding value from the destination system/infrastructure. Next, at block 1222, the template is processed. That is, the configuration defined in the template is applied to the destination computing environment. The operation then proceeds back to block 1206 to see if the queue Q1 is empty.

As a result of this operation, the configurations of the SDN component, such as a virtual router, can be migrated to another computing environment, such as another SDDC, without significant manual input. This reduces the opportunity for human errors drastically, saving months of time in troubleshooting errors in policies. As explained above, embodiments of the invention use a correlation mechanism to deduce all the interdependent substructures, thereby drastically reducing the user/operator burden, without requiring to change any of the existing rules/services/configurations. The user may need to provide a minimal set of inputs, while all other dependencies are derived through the correlation mechanism. Additionally, embodiments of the invention provide execution efficiency in terms for user inputs and processing of the file, since only a small section, i.e., the metadata section has to be read/processed in order to migrate the configurations.

Figure 13:
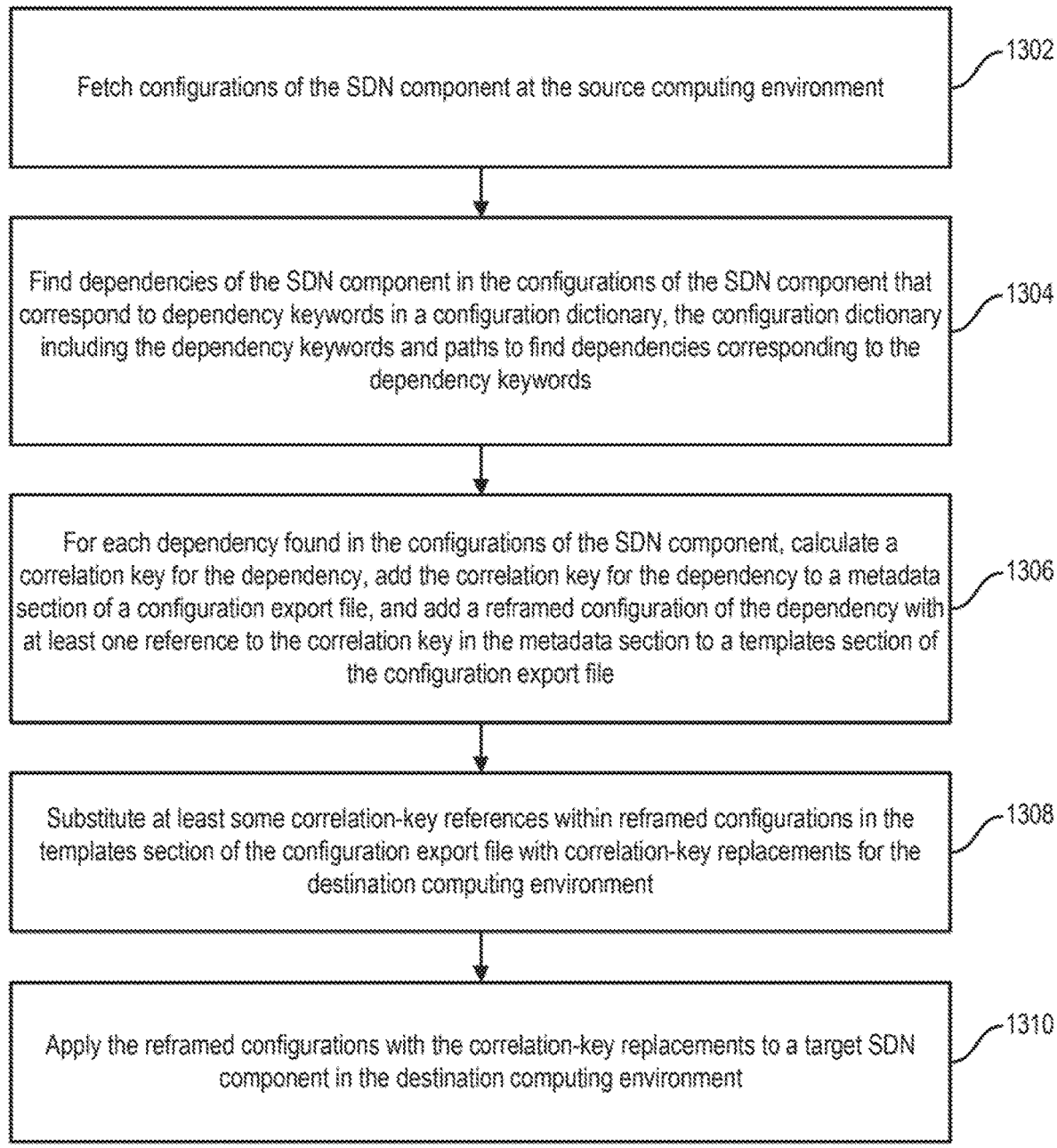
FIG. 13 is a process flow diagram of a computer-implemented method for migrating configurations of an SDN component from a source computing environment to a destination computing environment in accordance with an embodiment of the invention.

A computer-implemented method for migrating configurations of a software-defined network (SDN) component from a source computing environment to a destination computing environment in accordance with an embodiment of the invention is described with reference to a flow diagram of FIG. 13. At block 1302, configurations of the SDN component at the source computing environment are fetched. At block 1304, dependencies of the SDN component are found in the configurations of the SDN component that correspond to dependency keywords in a configurable dictionary, which includes the dependency keywords and paths to find dependencies corresponding to the dependency keywords. At block 1306, for each dependency found in the configurations of the SDN component, a correlation key for the dependency is calculated, the correlation key for the dependency is added to a metadata section of a configuration export file, and a reframed configuration of the dependency with at least one reference to the correlation key in the metadata section is added to a templates section of the configuration export file. At block 1308, at least some correlation-key references within reframed configurations in the templates section of the configuration export file are substituted with correlation-key replacements for the destination computing environment. At block 1310, the reframed configurations with the correlation-key replacements are applied to a target SDN component in the destination computing environment.

It is specifically noted here that embodiments of the invention may be extended to any infrastructure, SDDC, SDN and/or HCI (hyper-converged infrastructure).

Although some of the embodiments of the invention have been described as being applied to a hybrid cloud environment, various embodiments of the invention can be applied to multi-cloud environment since the dictionary can be trained to consume keywords from respective cloud-native APIs.

In addition, although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for migrating configurations of a software-defined network (SDN) component from a source computing environment to a destination computing environment, the method comprising:
    fetching configurations of the SDN component at the source computing environment;
    finding dependencies of the SDN component in the configurations of the SDN component that correspond to dependency keywords in a configurable dictionary, the configurable dictionary including the dependency keywords and paths to find dependencies corresponding to the dependency keywords;
    for each dependency found in the configurations of the SDN component, calculating a correlation key for the dependency, adding the correlation key for the dependency to a metadata section of a configuration export file, and adding a reframed configuration of the dependency with at least one reference to the correlation key in the metadata section to a templates section of the configuration export file;
    substituting at least some correlation-key references within reframed configurations in the templates section of the configuration export file with correlation-key replacements for the destination computing environment; and
    applying the reframed configurations with the correlation-key replacements to a target SDN component in the destination computing environment.

2. The method of claim 1, wherein the configuration export file includes a user-provided correlation-key replacement for a particular correlation key in the templates section of the configuration export file.

3. The method of claim 2, wherein the user-provided correlation-key replacement is located in the metadata section of the configuration export file.

4. The method of claim 1, wherein the paths in the metadata section are XPaths.

5. The method of claim 1, wherein the configuration export file is a Java Script Object Notification (JSON) file.

6. The method of claim 5, wherein the metadata section occupies at most ten percent of the total space of the JSON file.

7. The method of claim 1, further comprising generating a user prompt when one of the correlation keys in the configuration export file does not correspond to any subject in the destination computing environment, wherein the user prompt allows a user to ignore, fix or supply a replacement for that correlation key.

8. A non-transitory computer-readable storage medium containing program instructions for method for migrating configurations of a software-defined network (SDN) component from a source computing environment to a destination computing environment, wherein execution of the program instructions by one or more processors of a computer system causes the one or more processors to perform steps comprising:

fetching configurations of the SDN component at the source computing environment;

finding dependencies of the SDN component in the configurations of the SDN component that correspond to dependency keywords in a configurable dictionary, the configurable dictionary including the dependency keywords and paths to find dependencies corresponding to the dependency keywords;

for each dependency found in the configurations of the SDN component, calculating a correlation key for the dependency, adding the correlation key for the dependency to a metadata section of a configuration export file, and adding a reframed configuration of the dependency with at least one reference to the correlation key in the metadata section to a templates section of the configuration export file;

substituting at least some correlation-key references within reframed configurations in the templates section of the configuration export file with correlation-key replacements for the destination computing environment; and applying the reframed configurations with the correlation-key replacements to a target SDN component in the destination computing environment.

9. The computer-readable storage medium of claim 8, wherein the configuration export file includes a user-provided correlation-key replacement for a particular correlation key in the templates section of the configuration export file.

10. The computer-readable storage medium of claim 9, wherein the user-provided correlation-key replacement is located in the metadata section of the configuration export file.

11. The computer-readable storage medium of claim 8, wherein the paths in the metadata section are XPaths.

12. The computer-readable storage medium of claim 8, wherein the configuration export file is a Java Script Object Notification (JSON) file.

13. The computer-readable storage medium of claim 12, wherein the metadata section occupies at most ten percent of the total space of the JSON file.

14. The computer-readable storage medium of claim 8, wherein the steps further comprise generating a user prompt when one of the correlation keys in the configuration export file does not correspond to any subject in the destination computing environment, wherein the user prompt allows a user to ignore, fix or supply a replacement for that correlation key.

15. A system comprising:

memory; and at least one processor configured to:

fetch configurations of the SDN component at a source computing environment;

find dependencies of the SDN component in the configurations of the SDN component that correspond to dependency keywords in a configurable dictionary, the configurable dictionary including the dependency keywords and paths to find dependencies corresponding to the dependency keywords;

for each dependency found in the configurations of the SDN component, calculate a correlation key for the dependency, add the correlation key for the dependency to a metadata section of a configuration export file, and add a reframed configuration of the dependency with at least one reference to the correlation key in the metadata section to a templates section of the configuration export file;

substitute at least some correlation-key references within reframed configurations in the templates section of the configuration export file with correlation-key replacements for a destination computing environment; and apply the reframed configurations with the correlation-key replacements to a target SDN component in the destination computing environment.

16. The system of claim 15, wherein the configuration export file includes a user-provided correlation-key replacement for a particular correlation key in the templates section of the configuration export file.

17. The system of claim 16, wherein the user-provided correlation-key replacement is located in the metadata section of the configuration export file.

18. The system of claim 15, wherein the paths in the metadata section are XPaths.

19. The system of claim 15, wherein the configuration export file is a Java Script Object Notification (JSON) file.

20. The system of claim 19, wherein the at least one processor is configured to generate a user prompt when one of the correlation keys in the configuration export file does not correspond to any subject in the destination computing environment, wherein the user prompt allows a user to ignore, fix or supply a replacement for that correlation key.

* * * * *